United States Patent [11] 3,553,477

[72] Inventor Yu Hata
Tokyo, Japan
[21] Appl. No. 694,988
[22] Filed Jan. 2, 1968
[45] Patented Jan. 5, 1971
[73] Assignee TDK Electronics Company Limited
Tokyo, Japan
a corporation of Japan

[54] PARAMETRON DELAY LINE
4 Claims, 9 Drawing Figs.

[52] U.S. Cl. .......... 307/88, 333/29
[51] Int. Cl. .......... G11c 11/20, H03k 19/162
[50] Field of Search .......... 307/88P; 333/29

[56] References Cited
UNITED STATES PATENTS

| | | | |
|---|---|---|---|
| 3,432,681 | 3/1969 | Oshima et al. | 307/88 |
| 3,437,830 | 4/1969 | Lo Casale | 307/88 |
| 3,015,038 | 12/1961 | Takahasi | 307/88 |
| 3,399,309 | 8/1968 | Bartik et al. | 307/88 |

*Primary Examiner*—James W. Moffitt
*Attorney*—Wolfe, Hubbard, Leydig, Voit & Osann

ABSTRACT: A parametron delay line characterized in that oscillating elements each having a plurality of oscillating windings arranged at proper intervals in the axial direction of a bar-shaped magnetic body are arranged polygonally so that the same parametron oscillating elements may be excited by the same beats.

INVENTOR.
YU HATA
BY
Wolfe, Hubbard, Voit & Osann
ATTYS.

INVENTOR.
YU HATA
BY
Wolfe, Hubbard, Voit & Osann
ATTYS.

PARAMETRON DELAY LINE

This invention relates to parametron delay lines.

The conventional delay line circuitry using parametrons is based on a method wherein its input and output are made one unit by exactly the same method as in the case of forming a logic circuit of an odd number of inputs by coupling and connecting the input terminal and output terminal of each parametron through a coupling transformer. However, in the case of using many delay lines, for example, many series type memory registers, in a constant three-beat excitation, three parametrons are required for the memory of one bit. Therefore, for example, in a series type register in which 12 decimal digits are made one word by the binary coded decimalization of 4 bits, $3 \times 4 \times 12 = 144$ parametrons are required per word. If they are to be prepared for 100 words, $144 \times 100 = 14{,}400$ parametrons will be required. On the other hand, if a series type calculating circuit for carrying out addition, subtraction, multiplication and division is made, for example, of 1,500 words, it will be very uneconomical to form a parametron delay line circuitry by exactly the same method as in the above mentioned case of forming a logic circuit of an odd number of inputs. The present invention is suggested to eliminate the above mentioned defects.

An object of the present invention is to provide a novel delay line forming method for economically forming delay lines of parametrons.

Other objects of the present invention will become clear upon reading the following detailed disclosure and upon reference to the accompanying drawings wherein.

While the invention has been described in connection with the preferred embodiments, it will be understood that the invention is not limited to the particular embodiments shown, and that it is intended, on the contrary, to cover the various alternative and equivalent constructions included within the spirit and scope of the appended claims.

In a delay line circuitry, the coupling of parametrons with one another is always with one input and one output and they are coupled in series in the order of phases I→II→III→I in turn and have respectively one input terminal and output terminal for the input and output of a plurality of the thus connected parametrons.

Figures 1, 2:
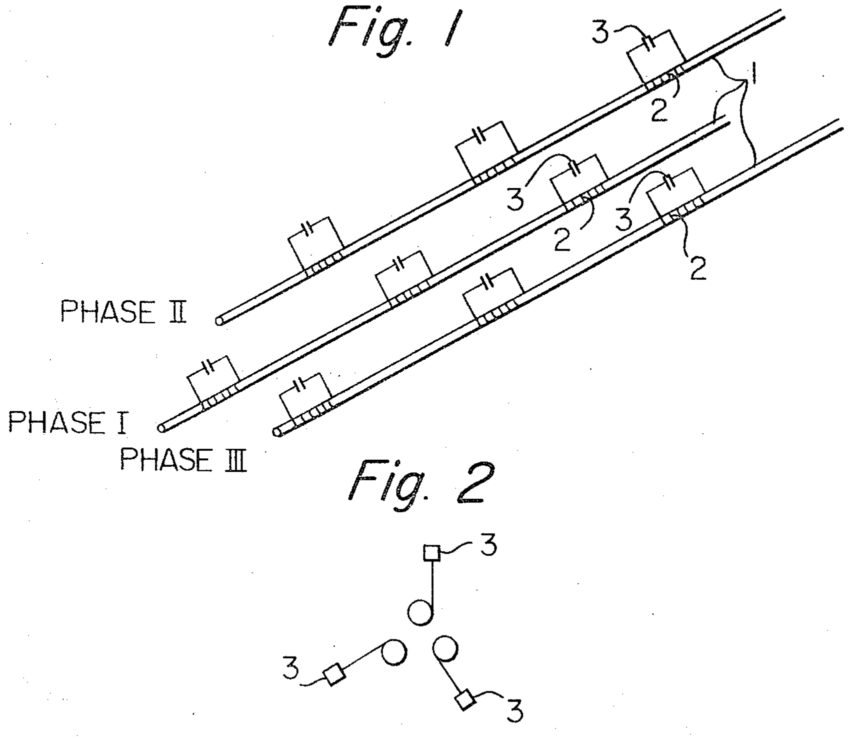
FIG. 1 is a perspective view of a parametron delay line in case the present invention is applied to a magnetic film.
FIG. 2 is a side view of a parametron delay line in case the present invention is applied to a magnetic film.
Figure 3:
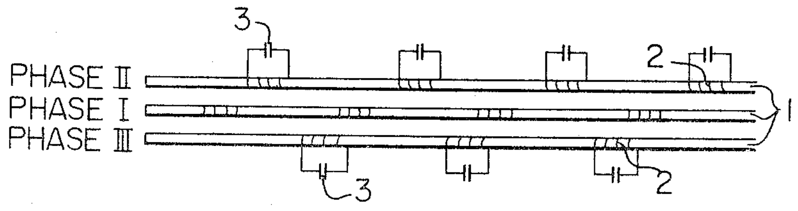
FIG. 3 is an elevation of the parametron delay line in FIG. 1.

An example of a formation of delay lines forming a delay line circuitry according to the present invention shall be shown on a magnetic film. In FIG. 1, 1 is a lead wire having a magnetic film formed on the surface (which wire shall be known merely as a lead wire hereinafter), 2 is a parametron oscillating winding applied at a proper spacing along the periphery of said lead wire 1 and, 3 is a tuning condenser connected in parallel with said oscillating wire 2. Three lead wires on which such crossing field parametrons are formed at proper intervals are so arranged that their axes may be positioned respectively at the apexes of an equilateral triangle and that the respective windings may be displaced by a proper distance according to the order of the beats of the excitation as illustrated. They are as in FIG. 2 as seen in the axial direction of the lead wires and as in FIG. 3 as seen in the direction at right angles with the axis.

Figure 4:
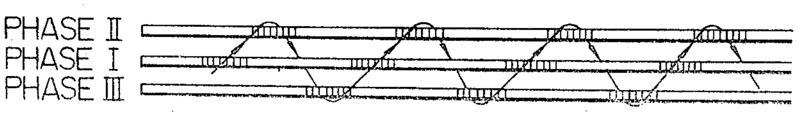
FIG. 4 is an explanatory view showing the movement of an information signal in FIG. 3.
Figure 5A:
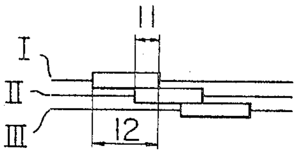
FIGS. 5A and 5C show arrangements of parametron delay lines ad
Figure 5C:
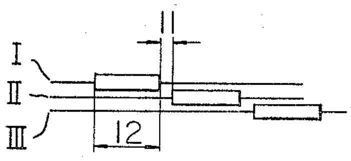
Figure 5B:
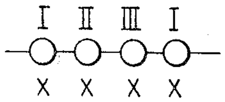
FIGS. 5B and 5D show wiring diagrams of parametrons.
Figure 5D:
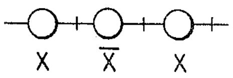

In such formation, when these parametrons are three-beat-excited, the adjacent oscillating wirings of different exciting beats will be coupled with each other by mutual induction. Therefore, if a binary coded information signal represented by the oscillating phase of the parametron is given to the parametron at the left end of the phase I, said binary coded information signal will move spirally as shown in FIG. 4 according to the order of the exciting beats in turn. In FIG. 4, in order to avoid complexity, the condenser is omitted. However, as the coupling of two adjacent windings is by mutual induction, in the phase of the binary coded signal induced in the adjacent windings of different beats, as shown by 12 in FIG. 5A, parametrons of a length $e$ of one line will be overlapped for a distance of more than or less than 11 and a constant three-beat excitation by an exciting current of the same beat will be made at the same phase whenever the binary coded information signal moves between the respective phases of the parametrons or will be made negative at each phase. The limit of the distance 11 is $e/4$ which is the point of the minimum sensitivity. FIG. 5A shows an example of overlapping for more than $e/4$. FIG. 5B utilizes parametron symbols to show that the information signal will move at the same phase. An overlapped state by another example is shown in FIG. 5C wherein the distance is 11 showing less than $e/4$. The movement of the information signal is shown in FIG. 5D. Whenever the binary coded information signal $x$ moves between the respective phases of parametrons, it will be made negative. This principle is the same as of the polarities of the primary and secondary coils of a transformer and depends on the direction of linking the overall magnetic fluxes. This means that, if one cycle of 3 beats is a delay time of $1\tau$, at $2\tau$ of parametrons of the same beats, the oscillating phases will be the same in the delay line circuitry.

In the mutual induction of adjacent windings of different beats, as the magnetic circuit is open and has a magnetic body in the core, when the parametron elements approach, the magnetic coupling will be large and the amount of the coupling attenuation will be sufficient to form a delay line and there will be a sufficient coupling attenuation for noises form outside.

Figure 6:
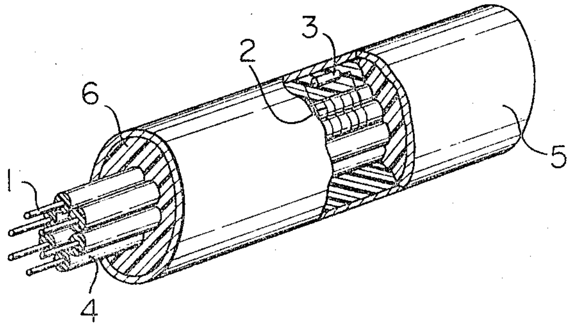
FIG. 6 is a partly sectioned perspective view showing another embodiment of the present invention.

In FIG. 6 showing an embodiment of the present invention, 1 is a crossing field parametron core made by folding back at one end a copper wire having a magnetic film formed on the surface, 4 is a celluloid pipe through which the wire is passed on each way of its reciprocation, 2 is an oscillating winding wound on said celluloid pipes 4 on both ways of the reciprocation and 3 is a condenser connected in parallel with the oscillating winding 2. Three parametron groups formed of them are so arranged in close contact with one another that they may be respectively at the apexes of an equilateral triangle and that the respective windings may be adjacent to one another according to the order of beats. 5 is a metallic cylinder prepared to magnetically shield the entire body. Six is a resin molding enclosing the parametrons in said metallic cylinder 5.

The folded magnetic film is of an Ni–Mo–Fe series permalloy. The thickness of the film is 1.2 $\mu$. The diameter of the copper wire of the core is 0.5 mm. The inside diameter of the celluloid pipe is 0.6 mm. Its outside diameter is 1.1 mm. The oscillating winding is of a thickness of 0.12 mm., is wound by 40 turns and is of a wound width of 6.5 mm. The centers of the film-coated copper wires made by bundling three folded parametron groups having such windings arranged at the intervals of about 13 mm. so as to be adjacent to one another in the order of the exciting beats form equilateral triangles having a distance of about 2 mm. from one another. When the tuning condenser is of about 12,000 pf, the exciting frequency is 2 M.C.P.S., the exciting current is about 200 ma. at the time of marking and the direct current bias current is about 150 ma., the amount of coupling attenuation will be about 26 db. and there will be a sufficient space for noises.

When the thus bundled three parametron groups are enclosed together with an epoxy series setting insulator in a metallic pipe of a diameter of 2.5 mm. and are provided at one end with an exciting terminal and input terminal and at the other end with an output terminal so as to be delay lines, a delay line circuitry of a large capacity will be able to be obtained very easily and economically by using very few materials in a very simple producing process. In this embodiment, a delay line circuitry of a pipe length of 320 mm. and a delay time of 15τ (a number of parametrons of 45) will be obtained and will be very small.

In another embodiment, if the delay line is formed of distributed capacity type parametrons using film-coated ferromagnetic wires, the fixed condenser will be omitted and a delay line of a simple structure of few parts having only film-coated ferromagnetic wires and coils will be obtained. In the parametron using a distributed capacity, a magnetic wire of a diameter of 0.038 mm. is closely parallelly wound on a film-coated ferromagnetic wire by 250 turns, is folded back at the end, is wound as overlapped on the first layer in the same manner, is folded back also at this end and is wound as overlapped in the same manner. If it is wound as overlapped in two or more layers, there will be used a resonance circuit utilizing a negative inductance appearing between the layers and made by the distributed capacity and the ferromagnetic body.

Therefore, the parametron line will be in the form of a bar and the same simple structure as in FIG. 4 in which the condenser is omitted will be obtained and will be most adapted to a parametron delay line.

As described above, according to the present invention, such special parts as, for example, coupling transformers, terminals and printed plates or lead wires for connection are not required. Therefore, it is very economical, small in the size and very high in the reliability. Further, the present invention is effective to apply specifically to magnetic films and is very low in the consumption of electric power (about 1 m.W. per parametron in the above mentioned embodiment) at a high speed. Thus, there can be obtained an economical memory element high in the reliability with a small size.

Further, in the above mentioned embodiment, the parametron lines are arranged triangularly. But, it is possible to arrange them polygonally.

I claim:

1. A parametron delay line comprising a plurality of electrically oscillatory elements each having a bar-shaped magnetic body and a plurality of electrically oscillatory windings arranged thereon at intervals in the axial direction of said body, said oscillatory elements being arranged in the form of a polygon of a number of sides equal to a predetermined number of exciting beats and having the oscillatory windings positioned on each element so that the respective windings on different elements are excited in accordance with the order of the beats, the same parametron oscillatory elements being excited by the same beats.

2. A parametron delay line according to claim 1 wherein said oscillatory elements are arranged in the form of an equilateral triangle having an oscillatory element positioned at each apex thereof.

3. A parametron delay line comprising a plurality of crossing field parametron cores each having a plurality of electrically oscillatory windings arranged thereon at intervals along the axial direction of said cores, said crossing field parametron cores being arranged in the form of a polygon of a number of sides equal to a number of exciting beats and having the oscillatory windings positioned on each crossing field core such that the respective windings of different cores are excited in accordance with the order of the beats, the same crossing field core being excited by the same beat; said parametric delay line being embedded in molding resin and encased in a metallic cylinder whereby the entire assembly is magnetically shielded.

4. A parametron delay line according to claim 3 wherein said crossing field parametron cores are arranged in the form of an equilateral triangle having one of said crossing field parametron cores positioned at each apex thereof.